United States Patent
Tidball et al.

(12) 
(10) Patent No.: US 6,837,426 B2
(45) Date of Patent: ***Jan. 4, 2005

(54) METHOD AND SYSTEM FOR ACCOUNT ACTIVATION

(75) Inventors: Thomas H. Tidball, Wilmington, DE (US); Dennis W. Bodman, Wilmington, DE (US)

(73) Assignee: Mas Inco Corporation, Wilmington, DE (US)

( * ) Notice: Subject to any disclaimer, the term of this patent is extended or adjusted under 35 U.S.C. 154(b) by 106 days.

This patent is subject to a terminal disclaimer.

(21) Appl. No.: 10/439,206

(22) Filed: May 15, 2003

(65) Prior Publication Data

US 2003/0197059 A1 Oct. 23, 2003

Related U.S. Application Data

(63) Continuation of application No. 09/779,068, filed on Feb. 8, 2001.
(60) Provisional application No. 60/182,171, filed on Feb. 14, 2000.

(51) Int. Cl.$^7$ ................................................. G06K 5/00
(52) U.S. Cl. ........................ 235/380; 235/379; 235/382; 902/22; 705/1
(58) Field of Search ................................. 235/379–380, 235/382; 902/22; 705/1

(56) References Cited

U.S. PATENT DOCUMENTS

| | | | |
|---|---|---|---|
| 5,101,098 | A | 3/1992 | Naito |
| 5,352,876 | A | 10/1994 | Watanabe et al. |
| 5,511,114 | A | 4/1996 | Stimson et al. |
| 5,903,633 | A | 5/1999 | Lorsch |
| 6,000,608 | A | 12/1999 | Dorf |
| 6,032,859 | A | 3/2000 | Muehlberger et al. |

*Primary Examiner*—Michael G. Lee
*Assistant Examiner*—Seung H Lee
(74) *Attorney, Agent, or Firm*—Akin Gump Strauss Hauer & Feld, L.L.P.

(57) ABSTRACT

A method of activating a prepaid account uses an existing electronic funds transfer network which includes a point-of-sale (POS) terminal, debit/credit card processing infrastructure and an account issuer authorization center. The method includes obtaining identification data concerning the account to be activated at the POS terminal; sending an activation request from the POS terminal through the card processing infrastructure to the processing center; receiving the activation request message at the processing center, deciding whether or not to activate the account and generating a response code based upon the activation decision, the response code not resulting in the transfer of any funds and being a code other than an approval code or a denial code; sending the response code through the card processing infrastructure to the POS terminal; and receiving the response code at the POS terminal and confirming at the POS terminal that the account has been activated.

14 Claims, 2 Drawing Sheets

METHOD AND SYSTEM FOR ACCOUNT ACTIVATION

CROSS-REFERENCE TO RELATED APPLICATIONS

This application is a continuation of application Ser. No. 09/779,068 filed Feb. 8, 2001 entitled "Method And System For Account Activation," the entire disclosure of which is incorporated herein by reference.

This application claims the benefit of U.S. Provisional Patent Application No. 60/182,171, filed Feb. 14, 2000 and entitled, "Method And System For Account Activation".

BACKGROUND OF THE INVENTION

The present invention relates generally to the activation of accounts and, more particularly, to the activation of consumer or other accounts which are associated with a product or service of value, including prepaid phone cards, gift cards, ATM cards, and the like utilizing an existing point-of-sale (POS) debit or credit card authorization processing system without any actual transfer of funds.

U.S. Pat. No. 6,000,608 entitled "Multifunctional Card System" describes and claims a system for the activation of cards, such as prepaid phone cards, gift cards, and the like utilizing an existing debit card/credit card processing system. As described in detail beginning at column 5, line 49, the system and methods employed in the '608 patent suffer from a significant drawback, namely because of the way the system functions, the activation of a card or other account using existing debit or credit card networks requires the actual transfer of funds, even de minimis funds, for activation of an account or card. The '608 patent describes a system and methods in which nominal funds (i.e., one cent or more) may be employed for this purpose. However, because of the requirement for an actual transfer of funds, the system and method described in the '608 patent suffers from certain inefficiencies. The present invention is an improvement upon the system and methods of the '608 patent in that it establishes a system and method for the activation of consumer or other accounts, including prepaid cards for goods or services using an existing credit/debit card processing system which does not require the transfer of any funds.

BRIEF SUMMARY OF THE INVENTION

Briefly stated, the present invention comprises a method of activating a prepaid account using an existing electronic funds transfer network, including a point-of-sale (POS) terminal, debit/credit card processing infrastructure and an account issuer authorization center. The method includes obtaining identification data concerning the account to be activated at the POS terminal; sending an activation request message, including the obtained identification data, from the POS terminal, through the card processing infrastructure to the account issuer authorization processing center; receiving the activation request message at the account issuer authorization processing center, deciding whether or not to activate the account and, if the decision is to activate the account, generating a response code based upon the decision to activate the account, the response code not resulting in the transfer of any funds and being a code other than an approval code or a denial code; sending the response code from the account issuer authorization processing center through the card processing infrastructure to the POS terminal; and receiving the response code at the POS terminal, decoding the response code and confirming at the POS terminal that the account has been activated.

In a preferred embodiment, the present invention comprises a method of activating a prepaid card using an existing electronic funds transfer network, including a point-of-sale (POS) terminal, debit/credit card processing infrastructure and an account issuer authorization center. The method includes obtaining identification data from the card to be activated at the POS terminal; sending an activation request message, including the identification data obtained from the card, from the POS terminal, through the card processing infrastructure to the account issuer authorization processing center; receiving the activation request message at the account issuer authorization processing center, deciding whether or not to activate the card and, if the decision is to activate the account, generating a response code based upon the decision to activate the account, the response code not resulting in the transfer of any funds and being a code other than an approval code or a denial code; sending the response code from the account issuer authorization processing center through the card processing infrastructure to the POS terminal; and receiving the response code at the POS terminal, decoding the response code and confirming at the POS terminal that the account has been activated.

BRIEF DESCRIPTION OF THE SEVERAL VIEWS OF THE DRAWINGS

The following detailed description of a preferred embodiment of the present invention will be better understood when read in conjunction with the appended drawings. For the purpose of illustrating the invention, there is shown in the drawings an embodiment which is presently preferred. It should be understood, however, that the invention is not limited to the precise arrangements and instrumentality shown. In the drawings.

DETAILED DESCRIPTION OF THE INVENTION

Figure 1:
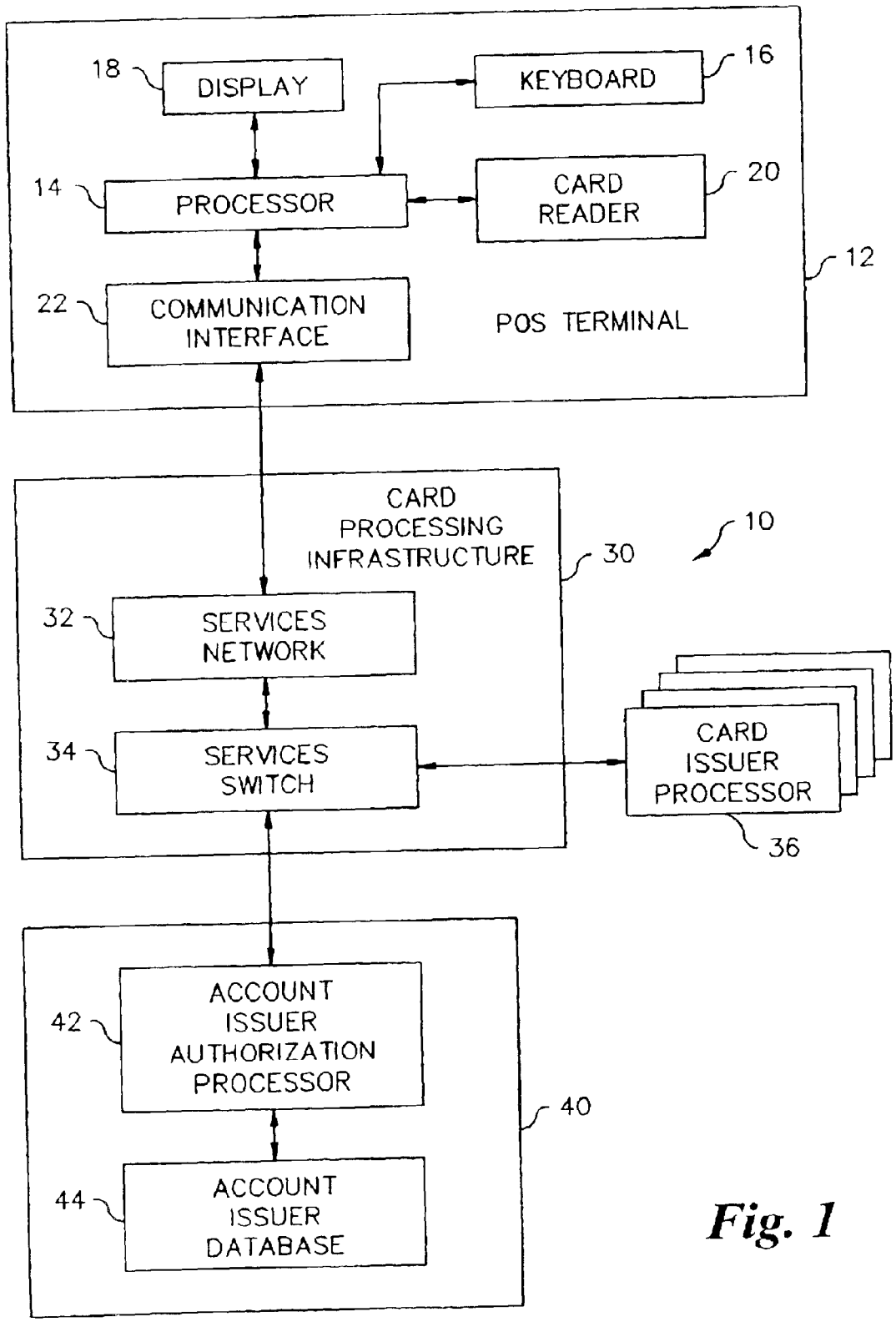
FIG. 1 is a functional schematic block diagram of the primary structural features of a system for account activation in accordance with a preferred embodiment of the present invention.

As discussed above, the present invention comprises an improvement over the system and methods disclosed in U.S. Pat. No. 6,008,608, the entire subject matter which is hereby incorporated herein by reference. FIG. 1 shows the principal functional components of a system 10 in accordance with a preferred embodiment of the present invention. The primary function of the system 10 is to provide real time notification by a merchant to an account issuer (i.e., card issuer) including appropriate information whenever the account issuer's "product" (i.e., an account or card) has been sold so that the value associated with the product can be activated to permit immediate, full usage of the product by the purchaser or other user. The activation process creates guaranteed value in a database account of the issuer which is immediately available for use by the purchaser once the account is credited with the amount of the purchase upon notification by the merchant.

The system 10, which uses standard electronic funds transfer (EFT) processing techniques and infrastructure, includes a point-of-sale (POS) terminal 12 which is located at a merchant facility or other convenient location. The POS terminal 12 is typical of POS terminals well known to those of ordinary skill in the art and includes an processor 14 for processing the information about the purchase of goods and services, a keyboard 16, keypad or other data entry device such as a touch screen, to facilitate entry of information regarding the purchase of goods or services, a display 18 such as a CRT, LCD or other display for displaying information to the terminal user and/or customer, a card reader 20 which may be a MIRC or other reader well known to those of ordinary skill in the art which functions to read the magnetic stripe or other identifier of credit, debit or other cards such as a prepaid telephone card, gift card, prepaid ATM card etc., and a communication interface 22 which functions to facilitate the communication of information from the POS terminal 12 to a remote location and to receive information from a remote location at the POS terminal 12.

It will be appreciated by those of ordinary skill in the art that the precise structure of the POS terminal 12 and the components of the POS terminal 12 may vary from the example POS terminal 12 provided in FIG. 1. The present invention is adapted to be employed in connection with any existing or future POS terminal and so such variations may be found. For example, some POS terminals may include a printer and some POS terminals may include more than one card reader. Similarly, some POS terminals may employ a communication interface which is positioned at a remote location, such as in the back room of a retail facility. Likewise, some POS terminals may not include a keyboard or other of the above described components. It will be appreciated by those skilled in the art that the precise structure of the POS terminal 12 should not be considered to be a limitation on the present invention which is equally applicable with respect to any and all POS terminals.

The second principal component of the system 10 in accordance with the present invention is an existing, typical debit card/credit card processing infrastructure 30 of a type well known in the art. For example, the card processing infrastructure 30 could be of the type employed in an existing electronic funds transfer (EFT) network. In the present embodiment, the card processing infrastructure 30 includes a services network 32, a services switch 34, and one or more card issuer processors 36. The services network 32 could be an existing money access services (MAS) network and the services switch 34 could be an existing MAS switch. Other types of services networks and/or services switches known to those skilled in the art may alternatively be employed. The card processing infrastructure 30 functions to receive information from one or more POS terminals 12 and after a series of authentication steps and the like conducted by the services network 32 or between the POS terminal 12 and the services network 32, the received information is passed to the switch 34 where it is "switched" and sent to the correct card issuer processor 36 for the particular debit card/credit card which is being employed for the purchase of goods or services by a purchaser at the POS terminal 12. Various components of the card processing infrastructure 30 may be co-located or may be located at different places depending upon the particular system. For example, the services network 32 and the services switch 34 may be co-located and the card issuer processors 36 may be at various different locations remote from the services network 32 and the services switch 34 and remote from each other. The location of the various components of the card processing infrastructure 30, as well as the type of equipment employed may vary from what is shown and described. The card processing infrastructure 30 functions in a manner well known in the art for the prompt, on-line processing of requests from POS terminals 12 for credit card or debit card authorization for the purchase of goods or services by a card holder. Further details regarding the structure and operational features of the components of the card processing infrastructure 30 are not presented herein, but are available from publicly available sources. Such details are not necessary for a complete understanding of the present invention.

The third principal component of the system 10 in accordance with the present invention is a specific account issuer-processing center 40, which may be a "card issuer processor" 36 for a particular card or account being activated. The account issuer-processing center 40 is typical of processing centers well known in the art and employed for remote activation of accounts, including cards, such as prepaid telephone cards, gift cards and the like. The account issuer-processing center 40 includes an account issuer authorization processor 42 and an account issuer database 44. The account issuer authorization processor 42 and the account issuer database 44 may be co-located or may be at separate locations. The structure of the account issuer authorization processor 42 and the account issuer database 44 are not presented herein, but are available from publicly available sources. Such details are not necessary for a complete understanding of the present invention. The purpose of the account issuer processing center 40 is to receive information from the card processing infrastructure 30 relating to an account to be activated and, after verification, based upon criteria established by the account issuer, sending appropriate information through the card-processing infrastructure 30 to the POS terminal 12 to confirm whether the account has or has not been activated.

The structure of the system 10 as shown in FIG. 1 and as described above is typical of existing systems of a type typically used for activation of prepaid and other cards and accounts and as described in the '608 patent. Typically, in using such systems, the activation of a card or account required the actual transfer of funds, even nominal funds, through the system, as suggested by the '608 patent. The transfer of funds, even nominal funds, through such systems resulted in significant bookkeeping and other unnecessary processing costs which significantly increased the per transaction cost of activation of an account or card using the system. The present invention involves using the above-described, existing system 10 with a minor modification at the POS terminal 12 in a manner that permits activation of an account or card as an informational transaction without the need for any actual funds, even nominal funds, being transferred and without the associated bookkeeping or other high transaction costs. Instead, with the present invention informational transactions occur which permits confirmation by an issuer that its product has been purchased and that the corresponding value in an account can be promptly activated. The present invention also permits confirmation to be sent by the issuer to the merchant or purchaser of the product or card that the value represented by the account or card is immediately available for use.

Figure 2:
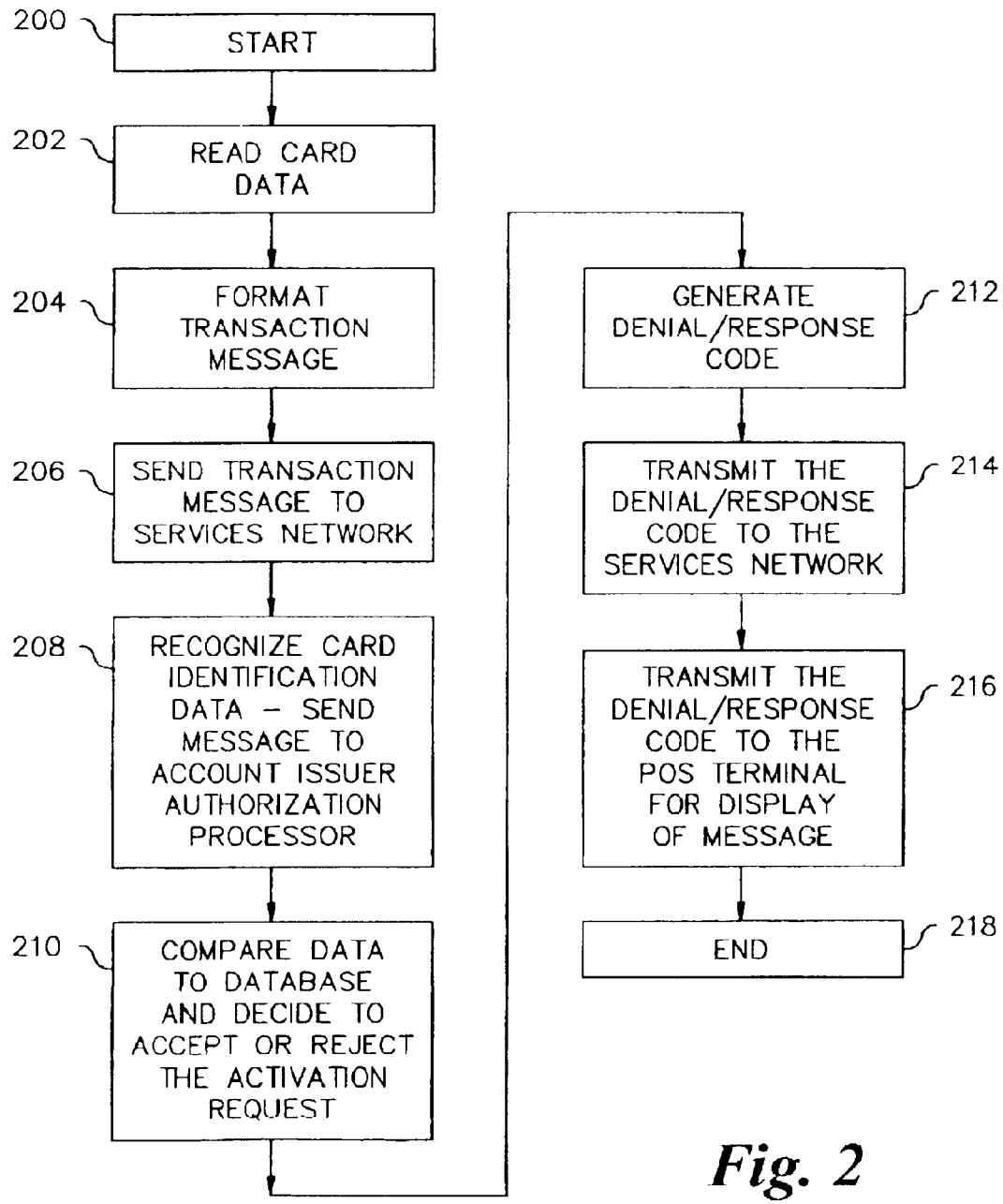
FIG. 2 is flow diagram of the major steps employed by the present invention in the activation of a prepaid card or an account using the system of FIG. 1.

FIG. 2 is a flow-diagram representation which demonstrates the use of the system 10 for activation of an account or card, in the present example, a prepaid telephone or phone card for a prescribed value or dollar amount, i.e. $10.00, which may be imprinted or stored on the card or may be selected at the time of purchase. It should be understood by those of ordinary skill in the art that although the steps involved in activation of a prepaid phone card are described, this is but one example of the type of account and/or card which may be activated using the system 10 and method of the present invention.

Referring now to FIG. 2, at the start (200) of the process an inactive prepaid telephone card for a particular value or dollar amount of phone service selected by a customer for purchase at a retail or other facility is read by the card reader 20 at a POS terminal 12 (step 202). Inactive telephone cards, which cannot be used to obtain phone service until activated are greatly preferred over "live" or preactivated phone cards because the inactive cards are less likely to be stolen. The POS terminal operator then formats a standard EFT "purchase" transaction or activation request message with appropriate identification information from the phone card and with the value or dollar amount of the prepaid phone card to be activated. (Step 204). The transaction message is then sent through the communication interface 22 as with any other EFT purchase transaction to the services network 32 (Step 206) where the message is decoded for routing purposes. The transaction message is received by the services network 32 at step 208, which recognizes the card identification data and activates the services switch 34 to send the transaction message to the particular account issuer authorization processor 42 associated with the particular prepaid phone card for which activation is requested. At step 210, the appropriate account issuer authorization processor 42 receives the transaction message, compares the card data and value or dollar amount within the transaction message to data stored in the account issuer database 44 and decides, based upon internal criteria established by the card issuer, whether to accept or reject the request for activation of the prepaid phone card for the specified value or dollar amount contained within the transaction message. The account issuer authorization processor 42 then issues one of two standard "denial" codes or "response" codes depending upon the decision which has been made. Neither of the denial codes and neither of the response codes are "approval" codes. For example, if the account issuer authorization processor 42 determines that the prepaid phone card should be activated for the specified value or dollar amount, a first standard denial code, such as an "AP" or "89" denial code is generated at step 212. Alternatively, a first non-financial, information only transaction "response" code could be generated. In either case, the transaction does not receive an approval code which would create a financial transaction. If the account issuer authorization processor 42 decides to reject the request for activation of the phone card then a second standard denial code, such as an "AR" or "90" denial code is generated. Alternatively, a second non-financial, information transaction "response" code could be generated. In either case, the transaction does not receive an approval code which would create a financial transaction. Other denial/response codes could be used if desired, including new codes developed specifically for this purpose. The important distinction with the present invention is that regardless of whether the account issuer authorization processor 42 decides to accept or reject the request for activation of the prepaid phone card or other account authorization, the response is always a standard network denial code or an information response code, never an approval code which would result in a money transaction. However, as will hereinafter be described in greater detail, a first denial or first information response code is treated as an acceptance resulting in activation of the prepaid phone card or other account for the specified value or dollar amount, whereas a second denial or second information response code is treated as a rejection or failure to activate the prepaid phone card or other account for which activation has been requested.

In either event, at step 214 the standard denial/response code generated by the account issuer authorization processor 42 is sent back through the services switch 34 to the services network 32 where it is treated as a "denial" or non-approval of the transaction. The denial/response code is thereafter sent to the POS terminal 12 (step 216). Upon receiving the denial/response code, the POS terminal 12 decodes, translates or interprets the denial/response code and confirms or displays on the display 18 the activation status which may be either "transaction accepted", if the first denial/response code is received or "transaction denied", if the second denial/response code is received. The process ends at step 218.

The advantage of using only a denial/response code in connection with the existing POS debit/credit card system is that no actual money or value is transferred, resulting only in an "informational" transaction with no actual transfer of funds, even nominal funds, which could result in bookkeeping and other unnecessary processing. With the present system, the merchant at the POS terminal is not charged a network interchange fee and no financial settlement of any kind occurs. No financial adjustments are required since no finances are processed. However, small standard messaging or processing fees are applied since such fees are applied even in the case of the denial of a transaction. Such fees are substantially less than the fees which are applied in the case of an actual transfer of value or funds. The only modification which is made to the existing system is a small software change to permit the POS terminal 12 to properly interpret the received denial/response codes and to confirm or display the activation status, i.e., "accepted" or "denied" to the terminal user or customer.

From the foregoing discussion, it can be seen that the present invention comprises an improved method for activation of prepaid cards or other account activation utilizing an existing debit card/credit card system without the actual transfer of or accounting for any funds or value. It will be appreciated by those of ordinary skill in the art that changes may be made to the embodiment described above without departing from the spirit and scope of the invention as defined by the appended claims.

We claim:

1. A method of activating a prepaid account using an existing electronic funds transfer network, including a point-of-sale (POS) terminal, debit/credit card processing infrastructure and an account issuer authorization center, the method comprising the steps of:

obtaining identification data concerning the account to be activated at the POS terminal;

sending an activation request message, including the obtained identification data, from the POS terminal, through the card processing infrastructure to the account issuer authorization processing center;

receiving the activation request message at the account issuer authorization processing center, deciding whether or not to activate the account and, if the decision is to activate the account, generating a response code based upon the decision to activate the account, the response code not resulting in the transfer of any funds and being a code other than an approval code or a denial code;

sending the response code from the account issuer authorization processing center through the card processing infrastructure to the POS terminal; and receiving the response code at the POS terminal, decoding the response code and confirming at the POS terminal that the account has been activated.

2. The method as recited in claim 1, wherein the identification data is obtained from a card associated with the account to be activated by reading the data from a portion of the card where the data is stored.

3. The method as recited in claim 2, wherein the card is read by swiping the card through a magnetic stripe reader at the POS terminal.

4. The method as recited in claim 1, wherein the activation request message includes a value for which activation of the account is requested.

5. The method as recited in claim 1, wherein an activation status of the account is displayed at the POS terminal.

6. The method as recited in claim 1, wherein the response code is an information code.

7. A method of activating a prepaid card using an existing electronic funds transfer network, including a point-of-sale (POS) terminal, debit/credit card processing infrastructure and an account issuer authorization center, the method comprising the steps of:

obtaining identification data from the card to be activated at the POS terminal;

sending an activation request message, including the identification data obtained from the card, from the POS terminal, through the card processing infrastructure to the account issuer authorization processing center;

receiving the activation request message at the account issuer authorization processing center, deciding whether or not to activate the card and, if the decision is to activate the account, generating a response code based upon the decision to activate the account, the response code not resulting in the transfer of any funds and being a code other than an approval code or a denial code;

sending the response code from the account issuer authorization processing center through the card processing infrastructure to the POS terminal; and receiving the response code at the POS terminal, decoding the response code and confirming at the POS terminal that the account has been activated.

8. The method as recited in claim 7, wherein the card comprises a prepaid telephone card.

9. The method as recited in claim 7, wherein the card comprise a prepaid gift card.

10. The method as recited in claim 7, wherein the identification data is obtained from a card by reading the data from a portion of the card where the data is stored.

11. The method as recited in claim 7, wherein the card is read by swiping the card through a magnetic stripe reader at the POS terminal.

12. The method as recited in claim 7, wherein the activation request message includes a value for which activation of the prepaid card is requested.

13. The method as recited in claim 7, wherein an activation status of the card is displayed at the POS terminal.

14. The method as recited in claim 7, wherein the response code is an information code.

* * * * *